J. A. CLARKE, Jr.
CONTROL APPARATUS.
APPLICATION FILED DEC. 18, 1914.
1,253,213.
Patented Jan. 15, 1918.
2 SHEETS—SHEET 1.
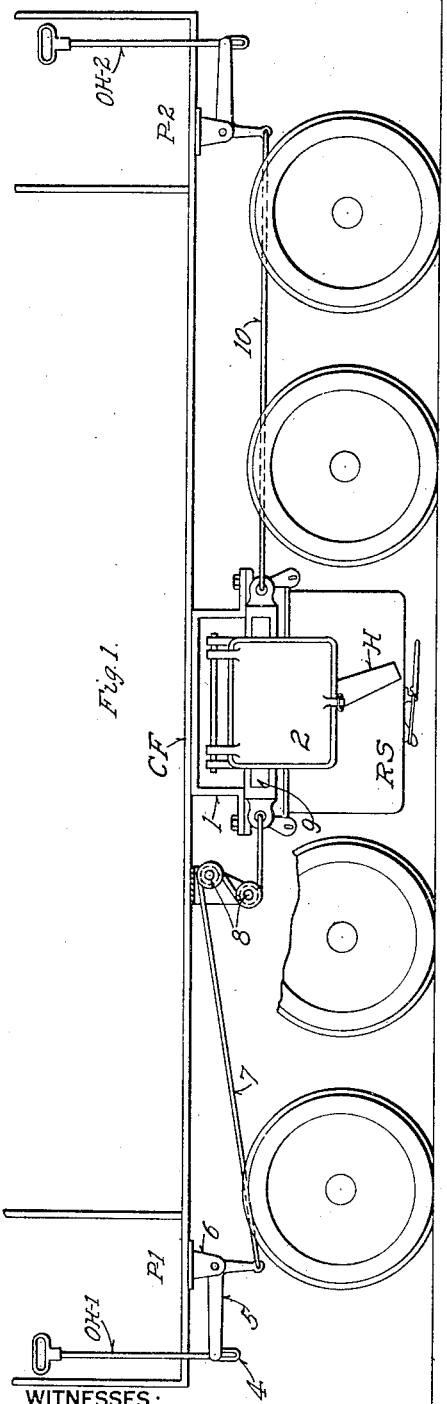
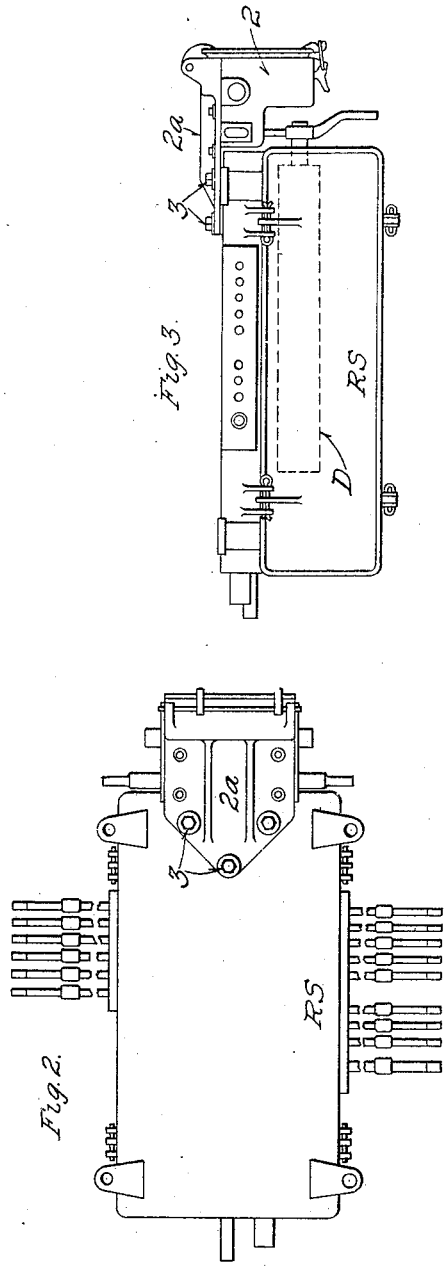
WITNESSES:
S. L. Armstrong
W. R. Coley
INVENTOR
John A. Clarke, Jr.
BY
Wiley G. Carr
ATTORNEY

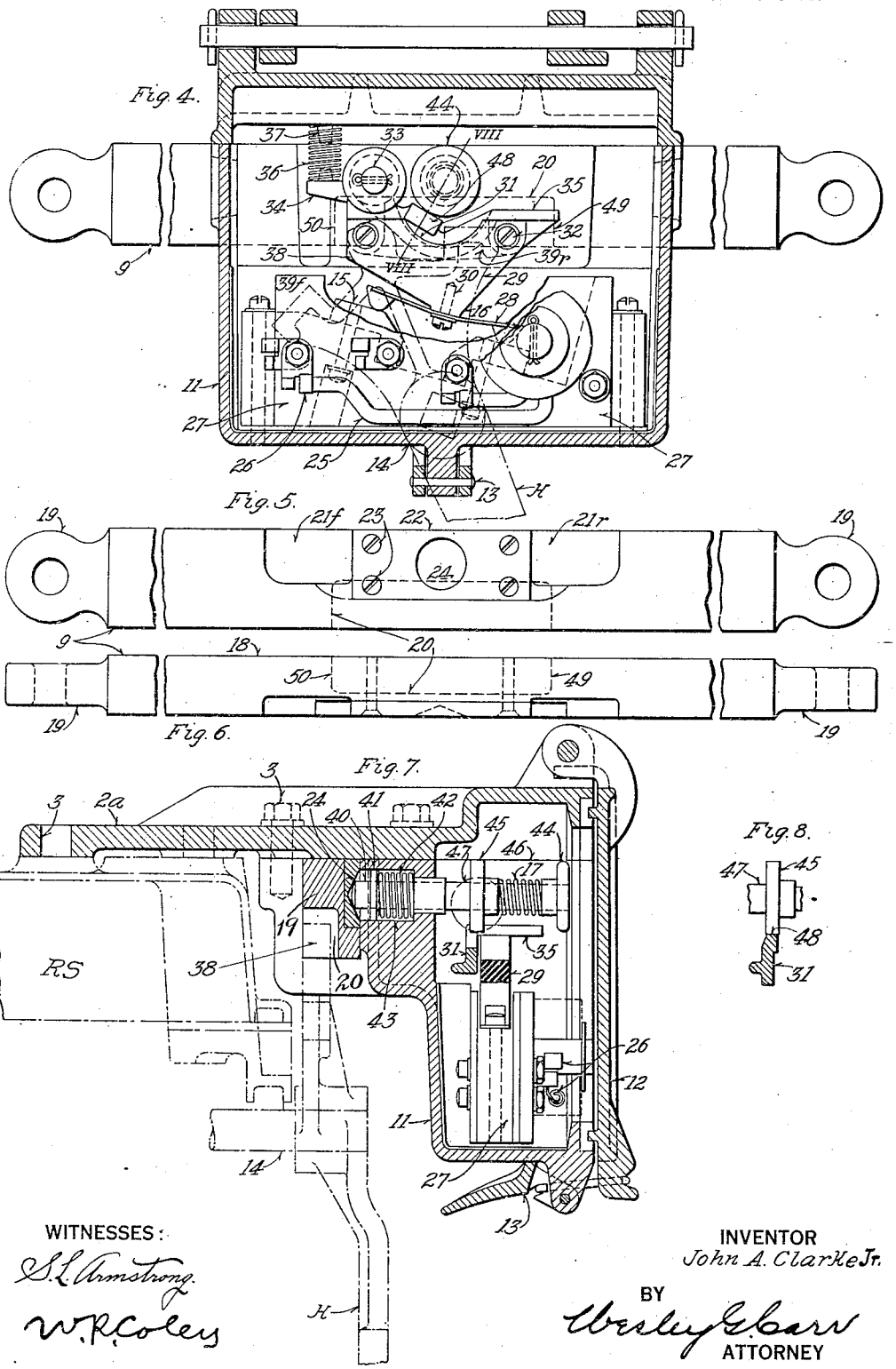

UNITED STATES PATENT OFFICE.

JOHN A. CLARKE, JR., OF WILKINSBURG, PENNSYLVANIA, ASSIGNOR TO WESTING-
HOUSE ELECTRIC AND MANUFACTURING COMPANY, A CORPORATION OF PENNSYL-
VANIA.

CONTROL APPARATUS.

1,253,213.  Specification of Letters Patent.  Patented Jan. 15, 1918.

Application filed December 18, 1914. Serial No. 877,948.

*To all whom it may concern:*

Be it known that I, JOHN A. CLARKE, Jr., a citizen of the United States, and a resident of Wilkinsburg, in the county of Allegheny and State of Pennsylvania, have invented a new and useful Improvement in Control Apparatus, of which the following is a specification.

My invention relates to control apparatus for electric motors, and it has special relation to control apparatus for use in electric railway vehicles and the like.

One object of my invention is to provide a relatively simple means for effectively and reliably braking a vehicle in an emergency, such as failure of the air brakes or interruption of the supply-circuit energy.

Another object of my invention is to provide purely mechanical means, operable from either platform of a vehicle, for actuating the motor reverser to disconnect the motors from the supply circuit and to set up dynamic braking.

A further object of my invention is to provide a simple and compact accessory device for motor reversers which shall not interfere in any way with the normal operation thereof and which, in addition, shall be adapted to permit of remotely controlled operation of the reverser; to automatically prevent operation thereof in a temporarily incorrect direction and to prevent opening of the reverser circuits, with consequent liability of damage by arcing upon separation of contact members, until the vehicle stops and the braking current has ceased to flow.

According to my present invention, I provide an emergency operating mechanism for motor reversers, preferably of the drum type, comprising a slidable bar that is adapted to engage a projection of the drum parts, operating handles located on the respective platforms of the vehicle and connected to the respective ends of the bar by means of suitable tension bars, such as rods, a spring-biased interlocking member that is adapted to engage certain openings in the bar to lock it in the proper emergency position, and other interlocking members that are adapted to prevent initial operation of the bar or the drum in an undesirable direction, as hereinafter more fully set forth.

My invention is particularly adapted for use in connection with the type of control system that embodies one or more sets of two motors that are permanently connected in parallel relation, whereby disconnection of the motors from the supply circuit and reversal of the electrical relations between the respective armatures and field windings, cause dynamic braking currents to traverse the several closed motor circuits, as will be understood.

In the accompanying drawing, Figure 1 is a view, in end elevation, of a motor reverser equipped with my emergency operating mechanism and mounted beneath the floor of an electric railway vehicle which is shown more or less diagrammatically. Fig. 2 is a plan view of the reverser and operating mechanism shown in Fig. 1, and Fig. 3 is a view, in side elevation, of the apparatus; Fig. 4 is an enlarged view, chiefly in elevation but with parts broken away for clearness, of an emergency operating mechanism constructed in accordance with my invention; Figs. 5 and 6 are views, in front and side elevation, respectively, of a portion of the apparatus shown in Fig. 4; Fig. 7 is a view, partially in section and partially in elevation, taken at right angles to the view shown in Fig. 4; and Fig. 8 is a fragmentary sectional view taken on the line VIII—VIII of Fig. 4.

Referring to Sheet 1 of the drawings, the structure here shown comprises a suitable electric railway vehicle having a floor CF and platforms $P^1$ and $P^2$ located at its respective ends; a motor-reversing switch RS, preferably of a familiar electrically-controlled type embodying a drum D, and secured to the under side of the car floor by means of a suitable bracket member 1; and my emergency operating mechanism 2, the base $2^a$ of which may be detachably secured to the reversing switch RS by means of a plurality of bolts 3. A plurality of operating handles $OH^1$ and $OH^2$ are located on the respective end platforms $P^1$ and $P^2$, and each handle is connected, through a lost-motion connection 4, to a bell-crank lever 5 that is pivotally mounted upon a bracket arm 6 beneath the car floor and may be connected (as shown at the left end of Fig. 1) by means of a cable 7, suitably associated with a plurality of pulleys 8, to one end of a slidable bar member 9 that constitutes a part of the operating mechanisms 2, as hereinafter more fully set forth. If desired, the bell-crank levers 5 may be secured to the corresponding end of the slidable bar 9 by means of a rod 10 (as shown at the right end of Fig. 1), thereby permitting operation of the bar 9 from the platforms in either direction, whereas, it will be appreciated that the bar 9 may be operated in only one direction through the agency of the cable 7.

The emergency operating mechanism 2 comprises, in addition to the slidable bar 9, a suitable incasing and supporting member 11 that is provided with a hinged outer cover member 12 that may be held normally closed by means of a suitable latch member 13; an operating handle H for the reversing switch RS, which may be secured to the shaft 14 of the reverser drum D in any suitable manner; a plurality of coöperating stationary and movable contact members 15 and 16, respectively; and an interlocking mechanism 17 that is associated with the bar 9 in a manner to be described.

The slidable bar 9 extends transversely of the drum D, and comprises a body portion 18 that is provided with suitably apertured end projections 19 for connection to the cable 7 or to the corresponding rod 10, as the case may be, and is also provided, on one side, with a longitudinally-extending, centrally located, opening or recess 20, and, on the opposite side, with a plurality of relatively deep recesses 21$^f$ and 21$^r$ that are located substantially equal distances from the center of the bar and respectively correspond to forward and reverse positions of the reverser drum, as described later, and with a wearing plate 22 of steel, or any other suitable material, that may be secured, by means of a plurality of screws 23, intermediate the recesses 21$^f$ and 21$^r$ and that has a relatively shallow, centrally-disposed, conical recess 24.

The two stationary contact members 15 are suitably connected to conductors 25 and appropriate terminal clips 26, all being mounted upon a stationary insulating member 27 that may be suitably held within the incasing member 11. The contact members 15 are preferably disposed in inclined alinement, to permit of relatively rapid separation of the movable contact member 16 therefrom, under the conditions to be described. The movable contact member 16 comprises a suitable finger 28 that is normally adapted to bridge the stationary contact members 15 and is mounted upon a suitable insulating block or base 29 by means of a screw 30; and a cam member 31, preferably of metal, that may be secured to the insulating block 29 by means of a plurality of screws 32 and is pivotally mounted upon a portion of the incasing member 11 at a point 33. The cam member 31 is also provided with a lug 34 at one end and a plate or lug 35 at its other end. A suitable spring 36 is adapted to act between the lug 34 and a point 37 of the incasing member 11 to bias the base 29 and the movable contact member 16 out of engagement with the stationary contact members 15, this action of the spring being normally prevented by reason of the cam member 31 engaging the interlocking member 17, as hereinafter set forth. The coöperating contact members 15 and 16 are adapted to be included in the circuit of the actuating coil of a switch that connects the supply circuit to the motor, in accordance with familiar practice, and, consequently, the main motor circuit is immediately opened by the separation of the contact members 15 and 16, in the manner to be described.

The operating handle H of the reversing switch RS is provided, at the end above the shaft 14, with a centrally located lug or knob 38 that is adapted to normally rest within the opening 20 of the bar 9, and a pair of oppositely-disposed side lugs 39$^f$ and 39$^r$ that are located on the opposite sides of the lug 38, respectively corresponding to forward and reverse positions of the reversing switch drum, and one of which—in this case lug 39$^r$—is also adapted to rest within the opening 20 when the handle H occupies one of its operating positions.

The interlocking member 17 comprises a reciprocatory rod or pin 40, the lower end of which is adapted to normally rest in the relatively shallow recess 24 of the slidable bar 9; a relatively stationary collar member 41 that is disposed near the said end of the pin; a suitable coiled spring 42 that is adapted to act between a portion of the incasing member 11 and the collar 41 within a recess 43 to bias the pin 40 to engagement with the bar 9; a suitable handle member 44 that is disposed at the outer end of the pin 40; and an intermediate collar member 45 which a coiled sping 46 is adapted to bias against a shoulder 47 of the pin 40. The collar 45 is adapted to normally engage the inclined surface 48 of the cam member 31 and hold it in the position shown, in opposition to the action of the spring 36 which tends to rotate the cam member in a counter-clockwise direction around the pivotal point 33.

Assuming the parts to occupy the positions shown, the operation of the structure illustrated may be described as follows: If it is attempted to move the bar 9 and, consequently, the reversing drum in the wrong direction, such action is prevented by reason of the side lug 39$^r$ on the handle H engaging the side wall 49 of the opening or recess 20 before the reversing switch is moved. However, in case the bar 9 is actuated in the proper direction to reverse the motor connections and set up the desired dynamic braking, the opposite side wall 50 of the opening 20 engages the centrally-located lug 38 of the handle H and moves it, together with the reversing switch, to a position corresponding to the reversed position of the reversing switch, wherein the handle H will be oppositely inclined to the vertical. Upon movement of the bar 9, the pin 40 is first actuated out of the relatively shallow recess 24 and finally drops into the relatively deep recess 21$^f$ or 21$^r$, as the case may be, when the reversing switch has reached its desired position. The relatively great depth of these recesses will prevent a further operation of the slidable bar 9 until the vehicle has stopped and the train operator manually resets the operating mechanism, as described later.

The initial movement of the pin 40 actuates the intermediate collar member 45 beyond the engaging surface 48 of the cam member 31, whereupon the spring 36, acting upon the lug 34, rapidly rotates the movable contact member 16 out of engagement with the stationary contact members 15, for the purpose already pointed out.

To reset the reversing switch and the operating mechanism 2, after the vehicle has stopped, the following procedure is followed: The pin 40 is pulled out of the recess 21$^f$ or 21$^r$ by means of the handle member 44 and the slidable bar 9 is then returned, through the agency of the handle H, to its intermediate position shown in the drawing, which position may readily be determined by reason of the pin 40 dropping into the relatively shallow recess 24. The reversing switch then occupies its proper position to allow the desired movement of the vehicle. To again bring the contact members 15 and 16 into engagement, it is necessary to slightly withdraw the pin 40 and, by means of the plate member 35, to rotate the contact member 16 against the action of the spring 36 into the desired contact with the members 15. The pin 40 may then be released to reëngage the recess 24, whereupon the collar member 45 will again engage the inclined surface 48 of the cam member 31, and the contact member 16 will be maintained in its closed position.

Some of the advantages of the structure described may be enumerated as follows: The reversing switch may be operated from either vehicle platform by mechanical means only, being entirely independent of any failure of air pressure or electrical energy. It is impossible for an operator to return the reversing switch to its original position until the vehicle has come to a full stop, thereby preventing injury to the reversing switch contact members by breaking the dynamic current that flows so long as the vehicle is in motion. The side lugs 39$^f$ and 39$^r$ prevent operation of the reversing switch in the wrong direction, and the interlocking device 17 locks the bar 9 in its correct position only. The operation of the emergency mechanism does not interfere in any way with the normal operation of the reversing switch except after it has been actuated by the mechanism itself. The main motor circuit is opened as soon as the slidable bar 9 is actuated, and the circuits remain open until the car comes to a full stop.

I do not wish to be restricted to the specific structural details or the arrangement of parts herein set forth, as modifications thereof may be made within the spirit and scope of my invention. I desire, therefore, that only such limitations shall be imposed as are indicated in the appended claims.

I claim as my invention:

1. The combination with a rotatable control drum, of a slidable member for directly effecting operation of said drum in the one or the other direction, and mechanical remotely-controlled means for effecting a movement of translation of said member to rotate the control drum.

2. The combination with a rotatable control drum, of a slidable member, and means for giving said member a movement of translation to effect rotation of said drum in a forward and a reverse direction.

3. The combination with a rotatable control drum, of an operating mechanism therefor comprising a slidable member adapted to engage a portion of the drum, remotely-controlled means for actuating said member, and interlocking means for preventing movement of the drum in a temporarily incorrect direction.

4. The combination with a rotatable control drum, of an operating mechanism therefor comprising a slidable member adapted to engage a portion of the drum, remotely-controlled means for actuating said member, and interlocking means for preventing consecutive operations of the drum by said slidable member.

5. The combination with a rotatable control drum, of an operating mechanism therefor comprising a slidable member adapted to engage a portion of the drum, remotely-controlled means for actuating said member, means for preventing movement of the drum in a temporarily incorrect direction, and means for preventing consecutive operations of the drum by said slidable member.

6. The combination with a rotatable control drum having a centrally-disposed shaft, of an operating mechanism therefor comprising a lever secured to said shaft and having its inner end provided with a centrally-disposed lug and a plurality of oppositely-disposed side lugs, a slidable bar having a longitudinally-extending recess in one side, a centrally disposed relatively shallow recess and a relatively deep recess located a predetermined distance on each side of said shallow recess in the other side thereof, the end walls of said longitudinally-extending recess being adapted to respectively engage the centrally disposed lug of said lever to effect movement thereof in the one or the other direction under predetermined conditions, and one of the lever side lugs being adapted to engage one of the said end walls to prevent movement of the lever in a temporarily incorrect direction, an interlocking member normally biased to rest in said relatively shallow recess and adapted to engage either of said relatively deep recesses to lock the lever, upon movement thereof in its new position, a plurality of operating handles respectively located remotely from the drum, and a plurality of tension members for connecting the said handles to the respective ends of said bar.

7. The combination with a rotatable control drum, of an operating mechanism therefor comprising a slidable member adapted to engage a portion of the drum for rotating the latter in a forward and a reverse direction, a set of coöperating stationary and movable contact members, and means operable upon a movement of translation of said slidable member for disengaging said contact members.

8. The combination with a rotatable control drum, of an operating mechanism therefor comprising a slidable member adapted to engage a portion of the drum and provided with a recess, said mechanism adapted to rotate the drum in a forward and a reverse direction, a set of coöperating stationary and movable contact members, a movable member normally biased to engage said recess, and means for effecting relatively rapid disengagement of said contact members when said movable member leaves said recess upon movement of said slidable member.

9. The combination with a rotatable control drum, of an operating mechanism therefor comprising a slidable member adapted to engage a portion of the drum and provided with a recess, a set of coöperating stationary and movable contact members, a supporting base for said movable contact member biased to an inoperative position, a reciprocatory rod normally biased to engage said recess and to latch said base in operative position, said rod being adapted to release said base to said inoperative position upon leaving said recess when said slidable member is actuated.

10. The combination with a rotatable drum and an incasing member therefor, of mechanism comprising a slidable member adapted to be detachably secured to said incasing member for externally actuating said drum.

11. The combination with a rotatable drum having a centrally-disposed shaft, and a supporting frame through which said shaft extends, of a drum-operating mechanism adapted to be detachably secured to said frame, and comprising a lever attached to said shaft, and a remotely-controlled slidable member adapted to engage said lever to actuate said drum in the one or the other direction when given a movement of translation.

12. The combination with a rotatable drum having a centrally-disposed shaft and a supporting frame through which said shaft extends, of a drum-operating mechanism having a supporting base member detachably secured to said frame and comprising a lever attached to said shaft and adapted for manual operation, and a remotely-controlled slidable member adapted to engage said lever to actuate said drum in the one or the other direction when given a movement of translation.

In testimony whereof, I have hereunto subscribed my name this 10th day of Dec., 1914.

JOHN A. CLARKE, Jr.

Witnesses:
G. R. IRWIN,
B. B. HINES.

Copies of this patent may be obtained for five cents each, by addressing the "Commissioner of Patents, Washington, D. C."